United States Patent Office 2,845,433
Patented July 29, 1958

2,845,433
EXTRACTION OF 4-AMINO-3-ISOXAZOLIDONE

Eugene E. Howe, Bound Brook, N. J., assignor to Merck & Co., Inc., Rahway, N. J., a corporation of New Jersey No Drawing. Application February 4, 1955
Serial No. 486,276

4 Claims. (Cl. 260—307)

This invention relates to novel processes for the purification of antibiotics; more particularly, it is concerned with methods of purifying D-4-amino-3-isoxazolidone and obtaining this product in pure crystalline form.

It has recently been found that the growth of the microorganism known as Streptomyces garyphalus in suitable fermentation mediums produces a valuable antibiotic, D-4-amino-3-isoxazolidone, also known as Antibiotic 106–7, a potent therapeutic agent active against both gram-negative and gram-positive organisms.

This antibiotic and methods of preparing the same by fermentation are described in detail in the application of Dale A. Harris, Frank J. Wolf and Robert L. Peck, Serial No. 365,271, filed June 30, 1953.

D-4-amino-3-isoxazolidone is an amphoteric substance with both acidic and basic characteristics. Thus, this antibiotic forms salts by reaction with bases. For example, by reacting this product with bases such as sodium hydroxide, potassium carbonate, calcium hydroxide and magnesium hydroxide, the sodium, potassium, calcium, and magnesium salts of D-4-amino-3-isoxazolidone are formed. Acid addition salts of this antibiotic such as the hydrochloride, sulfate, and the like are prepared by adding the appropriate acid to an aqueous solution of the antibiotic base.

D-4-amino-3-isoxazolidone has the structural formula

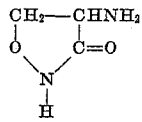

and is characterized and identified by the following properties:

(1) Being effective in inhibiting the growth of both gram-positive and gram-negative organisms;

(2) Being soluble in water and insoluble in anhydrous alcohols, acetone, chloroform, ethyl acetate, and pyridine;

(3) Decomposing on heating at a temperature of about 150–155° C.;

(4) Exhibiting in aqueous solution at a pH of about 6 an ultra-violet absorption maxima at about 2260 A.;

(5) And exhibiting in anhydrous crystalline form absorption bands in the infra-red region of the spectrum when suspended in solid form in a hydrocarbon oil at the following frequencies, expressed in microns 2.8–4.4 (multiple bands), 4.65, 6.12, 6.20 (shoulder), 6.30, 6.42, 6.52, 7.10, 7.3, 7.5, 7.85, 8.15, 8.55 (shoulder), 8.80, 9.40, 10.68, 10.9, 11.2–11.3 (shoulder), 11.38, 12.08, 13.25 and 15.

The isolation of D-4-amino-isoxazolidone and its purification have been particularly difficult since this product does not respond to the usual methods employed in the isolation and purification of antibiotics, such as adsorption on charcoal or alumina, or extraction with common solvents such as ether and butanol. One method of isolating and effecting a substantial purification of this antibiotic is described in the copending application of Rudolf P. Buhs, Edward J. Newstead and Nelson R. Trenner, Serial No. 298,844, filed July 14, 1952, now abandoned. This procedure involves treating an aqueous solution of D-4-amino-3-isoxazolidone with a strongly acidic cation-exchange resin to adsorb the antibiotic, and then eluting the antibiotic from the resin adsorbate with an aqueous solution of a base. From the basic eluate so obtained, it is possible to recover a product of greatly enhanced potency having up to about 30 times the activity of the starting material. Another method of further purifying D-4-amino-3-isoxazolidone is described in the copending application of Irving Putter, Serial No. 379,280, filed September 9, 1953, now abandoned. This method comprises adsorbing Antibiotic 106–7 onto a strongly basic quaternary ammonium type of anion exchange resin deriving its capacity from quaternary amine groups present in the polymer, and eluting the product with a solution containing a source of anions, such as an inorganic acid, an inorganic base, or an inorganic salt. For example, upon adsorbing D-4-amino-3-isoxazolidone from an aqueous solution having a pH of about 8.5 and assaying about 800 u./ml. obtained by the method shown in copending application Serial No. 298,844, onto a strongly basic anion exchanger of the quaternary ammonium type known as Amberlite IRA–400 on the hydroxyl cycle, and eluting the product with a 2% aqueous solution of acetic acid, an eluate assaying about 3–4000 u./ml. can be obtained. However, D-4-amino-3-isoxazolidone recovered from such purified concentrates must be purified still further to obtain a substantially pure crystalline product.

It is an object of the present invention to provide a process for effecting the further purification of D-4-amino-3-isoxazolidone and obtaining the product in substantially pure crystalline form. Other objects will be apparent from the detailed description of my invention hereinafter provided.

In accordance with this invention, it is now found that substantial purification of D-4-amino-3-isoxazolidone is achieved by extracting a concentrated aqueous solution of this product at an alkaline pH with a lower aliphatic alcohol, and recovering the product from the resulting alcohol extracts. Thus, by this method of selectively extracting an aqueous solution of a salt formed by reacting D-4-amino-3-isoxazolidone with a base with a lower slower aliphatic alcohol, it is possible to effect a considerable purification of the product. For example, by acidifying the alcoholic extract to a pH of about 5.5 to 6 and allowing the antibiotic to crystallize from solution, it is possible to recover crystalline D-4-amino-3-isoxazolidone having an activity of 300–325 units per milligram.

Alternatively, the purified product can be recovered from the alcoholic extracts by evaporating the solvent or by precipitation in the form of an alcohol insoluble salt, such as the sulfate.

In carrying out the processes of my invention, the aqueous solution of D-4-amino-3-isoxazolidone used as the starting material may be made alkaline with any of the common water-soluble bases such as an alkali metal hydroxide, an alkaline earth metal hydroxide, or ammonium hydroxide. Alternatively, any of the water soluble organic bases such as the lower aliphatic amines, including quaternary amines, may also be used. Although any of these various bases may be employed in my process, I generally prefer to utilize an alkali metal base, such as sodium or potassium hydroxide, or ammonium hydroxide since the use of these bases results in the obtainment of maximum yields of the antibiotic under optimum conditions. The pH of the aqueous concentrate being extracted may be from about 8 to 12 or above, although generally I find a pH of 9–10 to be most satisfactory.

Any of the lower aliphatic alcohols such as methanol, ethanol, and isopropanol, or mixtures of such alcohols, can be used as the extracting solvent in my process. The use of a mixture of ethanol and isopropanol is particularly advantageous in my process since it results in the obtainment of substantially pure crystalline product in high yields.

The alcoholic extracts containing the salt of D-4-amino-3-isoxazolidone extracted from the aqueous concentrate is adjusted to a pH of about 5.5 to 6.0 which is the natural pH of D-4-amino-3-isoxazolidone base; i. e. its "zwitter-ion" form. Both inorganic acids such as hydrochloric or sulfuric acid, and organic acids such as carboxylic acids, and sulfonic acids can be used to acidify the alcoholic extract. Generally, I find it most advantageous to use a lower aliphatic acid such as acetic acid or propionic acid for this purpose since the sodium and potassium salts of such acids are soluble in the alcoholic solvent and do not precipitate with the crystalline antibiotic. Additionally, the use of such acids is desirable since the salts formed operate as buffers to maintain the alcoholic solution at the desired pH.

My method of purifying D-4-amino-3-isoxazolidone and obtaining this product in crystalline form is particularly useful when employed in conjunction with the process described and claimed in Serial No. 379,280, filed September 9, 1953. Thus, for example, an eluate obtained by eluting the antibiotic from the strongly basic anion-exchange adsorbate with an aqueous solution of acetic acid, is first made basic to a pH of about 9.5 by the addition of potassium hydroxide, and the volume of the resulting solution reduced by evaporation under diminished pressure until the concentrate contains about 20,000–40,000 units/mg. of D-4-amino-3-isoxazolidone. To this resulting concentrate containing the potassium salt of D-4-amino-3-isoxazolidone is added about 10 volumes of a 1:1 mixture of ethanol and isopropanol. The resulting clarified alcoholic extract containing the potassium salt of the antibiotic is then acidified with glacial acetic acid to a pH of about 5.7–6.0 and cooled with stirring for several hours thereby causing the antibiotic to crystallize. The crystallized D-4-amino-3-isoxazolidone so obtained usually exhibits a potency of about 275–325 units per milligram depending upon the purity of the starting material.

The following examples are presented for the purpose of illustrating my method of purifying D-4-amino-3-isoxazolidone and providing a better understanding of my invention.

*Example 1*

The rich eluate obtained by the purification method of Serial No. 298,844 described below was adjusted to pH 10 with sodium hydroxide. The alkalized rich eluate was then concentrated to 350 ml. with continual addition of sodium hydroxide sufficient to maintain the pH at about 10.0. The concentrated solution assayed 22,000 *Staph. aureus* units/ml. Ten milliliters of this concentrate were diluted with about fifty ml. of isopropanol. The isopropanol insoluble oily layer was separated and washed with a small volume of isopropanol. The isopropanol extracts were combined and acidified to about pH 6.0 with glacial acetic acid and the resulting solution cooled in an ice bath for one hour. The crystals of D-4-amino-isoxazolidone obtained weighed 300 mg. and assayed about 250 units/mg.

The rich eluate used as the starting material in this example, was obtained by eluting D-4-amino-3-isoxazolidone with 0.3 N ammonium hydroxide solution from an Amberlite IR-120 resin adsorbate prepared by contacting this resin on the sodium cycle with a solution of 100 g. of D-4-amino-3-isoxazolidone sulfate (potency 60–88 u./mg.) in four liters of water.

*Example 2*

Three-hundred ml. of the alkaline solution of D-4-amino-3-isoxazolidone concentrate prepared as described in Example 1 (22,000 units/ml.) was diluted with 1500 ml. of isopropanol. The resulting solution was centrifuged and filtered with 3 grams of Supercel. The filtrate was cooled in an ice bath to about 0° C., adjusted to about pH 6.0 with glacial acetic acid, and stirred for one hour after seeding with crystalline D-4-amino-3-isoxazolidone. The crystals formed were filtered, washed with isopropanol, ether, and dried under reduced pressure. The dry weight of the crystalline antibotic was 5.5 grams and assayed about 290 units/mg.

The isopropanol mother liquor was diluted with water to 100 ml. and treated with 800 ml. ethanol. Four grams of Supercel was added and the mixture filtered. The filtrate was cooled to about 0° C. in an ice bath and acidified to pH 6.0 with glacial acetic acid. The clear supernatant liquor was decanted from the oil which formed and stirring continued for one hour. The crystals obtained from the supernatant were filtered, washed with ethanol and ether, and dried in vacuo. The weight of crystals obtained was 6.2 grams with a potency of about 260 units/mg.

*Example 3*

Thirty-four thousand ml. of resin eluate (assay=1670 units) of D-4-amino-3-isoxazolidone prepared as described below was treated with 3,000 g. of activated charcoal at pH 7.5. The charcoal was removed by filtration and the filtrate concentrated to about 3650 ml. The concentrate was then diluted with about five volumes of isopropanol and the isopropanol layer decanted from the aqueous oil. The oily phase was diluted to 500 ml. with water and again diluted with five volumes of isopropanol. The isopropanol extracts were combined, stirred with 100 grams of Supercel and filtered. The D-4-amino-3-isoxazolidone was crystallized by stirring the filtrate in an ice bath and adjusting the pH to 6 with glacial acetic acid. The crystalline product weighed about 53 grams and had a potency of 240 units/mg.

One gram of the crystals so produced was dissolved in about 10 ml. of water and adjusted to pH 12 with potassium hydroxide. The solution was treated with 20 ml. of ethanol and 40 ml. of isopropanol. A small amount of Supercel was added and the mixture filtered. The filtrate was cooled in an ice bath and adjusted to pH 5.8 with glacial acetic acid. The crystals obtained weighed 710 mg. and had a potency of about 300 units/mg.

The resin eluate employed as the starting material in this example was obtained by eluting D-4-amino-3-isoxazolidone adsorbed in Amberlite XE–98 with a 2% solution of acetic acid.

*Example 4*

Fifteen ml. of a concentrated Amberlite XE–98 eluate prepared as shown in Example 3, adjusted to pH 9.0 with potassium hydroxide and containing 44,000 units of D-4-amino-3-isoxazolidone was then treated with 75 ml. of ethanol and 75 ml. of isopropanol. 1.5 grams of Supercel was added and the resulting slurry filtered. The filtrate was cooled in an ice bath and acidified with glacial acetic acid to pH 6.0. The crystalline product thus obtaned weighed 1.2 grams and had a potency of about 310 units/mg.

*Example 5*

To ten ml. of an Amberlite XE–98 eluate prepared as shown in Example 3 containing 18,000 units of D-4-amino-3-isoxazolidone made alkaline with potassium hydroxide, was added 50 ml. of ethanol and 50 ml. of isopropanol. The solution was agitated for about five minutes at room temperature and centrifuged to remove the oily layer (about 10 ml.) which separated. The alcoholic extract was cooled to about 5° C. and glacial acetic acid added until the pH dropped to about 6.0. The mixture was stirred at 0–5° C. for about one hour. The crystals were collected by filtration, washed with isopropanol and ether and dried in vacuo at 25° C. The product weighed 300 mg. and assayed 295 units/mg.

*Example 6*

About one liter of an aqueous solution containing about 3,210,000 units of D-4-amino-3-isoxazolidone was alkalized to a pH of 8.5, treated with activated charcoal and filtered. The pH of the filtrate was adjusted to about 10.5 to 11.0 and concentrated under reduced pressure to a final volume of 100 ml. The concentrate was diluted with 500 ml. of isopropanol and 500 ml. of ethanol. Several grams of Supercel was added and the mixture stirred and filtered. The pH of the alcoholic extract (filtrate) was then adjusted to about 5.8 and cooled. The crystalline D-4-amino-3-isoxazolidone thus produced had a potency of about 305 units/mg.

D-4-amino-3-isoxazolidone and its acid salts and metal salts are useful antimicrobial agents. Thus, they can be utilized to remove susceptible microorganisms from pharmaceutical equipment and the like, or to separate certain microorganisms from solutions containing mixtures of several microorganisms. In addition, they are useful for topical application and aid in restoring healthy tissue. For this purpose they can be used in solution, or in the form of an ointment and the like prepared in accordance with procedures known in the art.

Further, D-4-amino-3-isoxazolidone and its acid and metal salts are useful growth promoting agents for certain animals. Thus, swine which were fed an adequate diet supplemented with small amounts of D-4-amino-3-isoxazolidone gained weight more rapidly than those maintained on the unsupplemented diet.

Also, D-4-amino-3-isoxazolidone or its salts are useful in the treatment of animals infected with microorganisms which are susceptible to the action of these products. For example, it has been found that they are effective in the treatment of bovine mastitis.

The D-4-amino-3-isoxazolidone or salts thereof can be used either in the form of pure products or concentrates thereof prepared as described above depending upon the particular purpose for which it is intended. Usually, it is preferred to use the antibiotic agent in the form of a metal salt since these salts are unusually stable.

D-4-amino-3-isoxazolidone is also known by the name oxamycin.

This application is a continuation-in-part of Serial No. 386,391 filed October 15, 1953, now abandoned.

Various changes and modifications in the procedures herein disclosed will occur to those skilled in the art, and to the extent that such changes and modifications are embraced by the appended claims, it is to be understood that they constitute part of my invention.

I claim:

1. A process which comprises intimately contacting an aqueous solution of an alkali metal salt of D-4-amino-3-isoxazolidone, said solution having a pH of about 8 to 12 and containing D-4-amino-3-isoxazolidone in a concentration in excess of about 15,000 units/ml., with at least five volumes of an alcohol from the group consisting of ethanol and isopropanol, separating the alcoholic extract, acidifying said alcoholic extract to a pH of about 5.5 to 6.0 with acetic acid, and recovering crystalline D-4-amino-3-isoxazolidone from the resulting acidified alcoholic extract.

2. The process of claim 1 wherein the extracting alcohol is a mixture of ethanol and isopropanol.

3. The process of claim 1 wherein the alkali metal salt is the sodium salt.

4. The process of claim 1 wherein the alkali metal salt is the potassium salt.

References Cited in the file of this patent

UNITED STATES PATENTS

| 2,642,459 | White | June 16, 1953 |
| 2,773,878 | Shull et al. | Dec. 11, 1956 |

FOREIGN PATENTS

| 834,992 | Germany | Mar. 27, 1952 |
| 715,362 | Great Britain | Sept. 15, 1954 |

OTHER REFERENCES

Gattermann: "Organic Chemistry" (Macmillan), pp. 43–44 (1923).

MacArdle: "Use of Solvents in Synthetic Org. Chem." (Van Nostrand), pp. 40, 74 (1925).